United States Patent
Weber

(10) Patent No.: US 12,520,968 B2
(45) Date of Patent: Jan. 13, 2026

(54) AUTOMATED COFFEE GROUNDS HOMOGENIZER

(71) Applicant: Strategic Exits LLC, Incline Village, NV (US)

(72) Inventor: Douglas Weber, Incline Village, NV (US)

(73) Assignee: Strategic Exits LLC, Incline Village, NV (US)

( * ) Notice: Subject to any disclaimer, the term of this patent is extended or adjusted under 35 U.S.C. 154(b) by 585 days.

(21) Appl. No.: 18/099,963

(22) Filed: Jan. 22, 2023

(65) Prior Publication Data

US 2024/0245263 A1 Jul. 25, 2024

(51) Int. Cl.
*A47J 42/36* (2006.01)
*A47J 31/06* (2006.01)
*A47J 42/46* (2006.01)
*A47J 43/044* (2006.01)
*A47J 43/10* (2006.01)

(52) U.S. Cl.
CPC .......... *A47J 42/36* (2013.01); *A47J 31/0663* (2013.01); *A47J 42/46* (2013.01); *A47J 43/1006* (2013.01); *A47J 2043/04409* (2013.01)

(58) Field of Classification Search
CPC .. A47J 42/36; A47J 42/38; A47J 42/46; A47J 31/42; A47J 31/44; A47J 31/3671; A47J 31/0657; A47J 31/0663; A47J 43/1006; A47J 43/044; A47J 43/04409; A47J 2043/04427; B01F 27/1121; B01F 27/1124; B01F 27/80; B01F 27/84; B01F 27/85

See application file for complete search history.

(56) References Cited

U.S. PATENT DOCUMENTS

| | | | | |
|---|---|---|---|---|
| 2012/0048120 | A1* | 3/2012 | Gillaspie | A47J 42/38 99/287 |
| 2016/0088975 | A1* | 3/2016 | King | B65G 11/206 222/1 |
| 2016/0143480 | A1* | 5/2016 | Watts | A47J 42/42 241/79 |
| 2017/0274332 | A1* | 9/2017 | Gandhi | B01F 27/213 |
| 2020/0054162 | A1* | 2/2020 | Cheng | A47J 42/34 |

(Continued)

OTHER PUBLICATIONS baristahustle.com, Jan. 3, 2023, https://www.baristahustle.com/blog/weiss-distribution-technique/.

(Continued)

*Primary Examiner* — Alain Chau
(74) *Attorney, Agent, or Firm* — Todd R. Miller

(57) ABSTRACT

An automated coffee grounds homogenizer is disclosed. The homogenizing tool comprises a body having a central axis, a plurality of stirs extending away from the body, and a gear means for randomly rotating the plurality of stirs about the central axis of the body. The gear means has differently sized gears that may be interchangeable with one another whereby the path of rotation of the stirs about the central axis of the body may be changed by switching out one of the plurality of gears with another of the plurality of gears. In a similar vein, each stir is preferably magnetically detachable to the gear means wherein switching out the placement of each stir changes the path of random rotation of the stirs about the central axis.

17 Claims, 4 Drawing Sheets

(56) References Cited

U.S. PATENT DOCUMENTS

2021/0015294 A1* 1/2021 Lin .................... A47J 31/3671
2025/0050289 A1* 2/2025 Goldman ............ B01F 27/1123

OTHER PUBLICATIONS amazon.com, Jan. 17, 2023, https://www.amazon.com/XDENGP-Espresso-Distribution-Accessories-Distributor/dp/B0B2ZY6SGY?th=1.
coffeeduomo.store, Jan. 22, 2023, https://coffeeduomo.store/category/duomo-shop/69/.
normcorewares.com, Jan. 22, 2023, https://www.normcorewares.com/collections/bottomless-portafilter/products/hormcore-needle-style-distributor-tool-v2.

* cited by examiner

AUTOMATED COFFEE GROUNDS HOMOGENIZER

BACKGROUND

The present disclosure relates generally to a tool for improving coffee making and particularly to a tool for preparing coffee grounds.

OBJECT AND SUMMARY

The object of the instant invention is to provide a tool to automate the preparation of coffee grounds before tamping wherein any user may properly, consistently, cleanly, and quickly homogenize a coffee bed to ensure an evenly extracted coffee.

One exemplary embodiment of the disclosed subject matter is an automated coffee grounds homogenizer comprising a body having a central axis, a plurality of stirs extending away from the body, and a gear means for randomly rotating the plurality of stirs about the central axis of the body. The body has a top and an opposing bottom. Each stir also has a top and an opposing bottom. The top of each stir is in communication with the body, wherein the bottom of each stir extends away from the bottom of the body. The body preferably includes a base and a cap rotatably disposed about the base. Rotation of the cap engages the gear means to rotate the plurality of stirs randomly about the central axis.

The gear means preferably includes an outer gear and an inner gear set. The outer gear is disposed within the body; the inner gear set is in communication with the outer gear. The inner gear set preferably includes a plurality of gears with each having a different diameter. The plurality of gears may be interchangeable with one another whereby the path of rotation of the stirs about the central axis of the body may be changed by switching out one of the plurality of gears with another of the plurality of gears.

Each stir is preferably detachable to the inner gear set by magnetic means. In particular, the homogenizer may include a plurality of magnet channels cut within a respective gear of the inner gear set, and a plurality of magnets, wherein each magnet is fitted within one of the channels. The length of each stir of the automated coffee grounds homogenizing tool is preferably of a length sufficient to reach near the bottom of the portafilter.

The automated coffee grounds homogenizer may further comprise an elastomer gasket coupled to the base, wherein the elastomer gasket is configured to seat about the top of a portafilter. The elastomer gasket is configured to provide a frictional force great enough to keep the base seated about the portafilter during rotation of the plurality of stirs. The automated coffee grounds homogenizer may also include a window coupled to the cap.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

Figure 1:
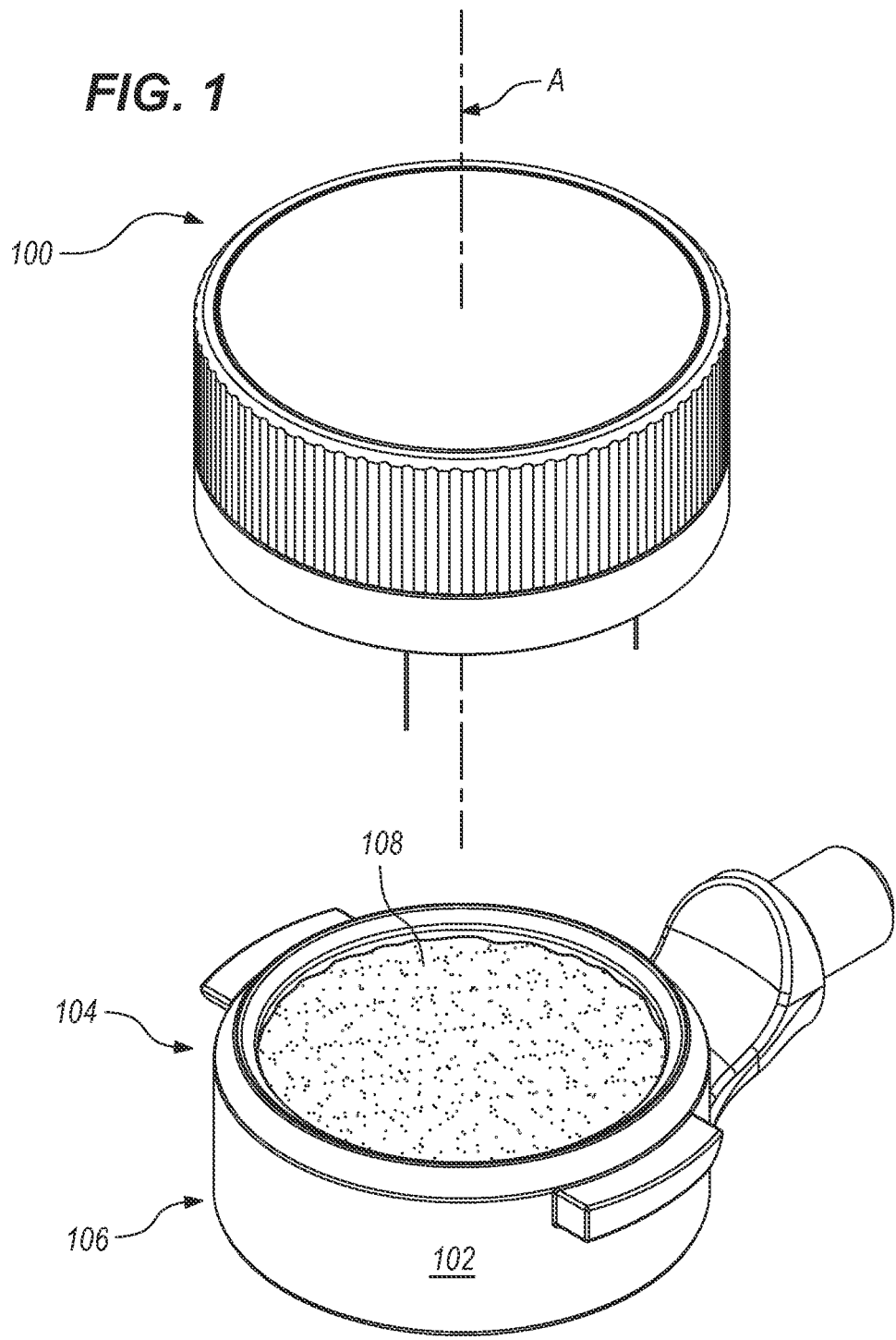
FIG. 1 is a top perspective view of an embodiment of the automated coffee grounds homogenizer disclosed herein, wherein the device is shown in its working environment above a portafilter filled with ground coffee.

The aim to create the perfect espresso is a popular task amongst cafes and home baristas. To create the perfect espresso, those familiar with the art know that "puck preparation" is critical to success. This preparation includes everything from the grinding of the coffee beans, placement into the brewing receptacle (a portafilter in the case of espresso), preparation before tamping, tamping, and then the espresso extraction itself. "Preparation before tamping" often includes a process referred to as the Weiss Distribution Technique, named for the first person known to post publicly about it online. The Weiss Distribution Technique is essentially using a comb-like implement of thin wires to mix up and homogenize the ground coffee in the portafilter before tamping. This mixing helps to break up clumps of coffee that may have been created as they exited the grinder, and when done correctly, helps to form an even-density bed of coffee grounds before tamping. The end result is, hopefully, evenly-extracted coffee with a decrease in the average amount of bitterness and astringency, as well as a more consistent extraction level.

Unfortunately, conventional "distribution tools" have myriad problems. Some such tools have loops at the end of each wire. Such loops create clumps and channels and thus do more harm than good, let alone fail to homogenize properly the bed of coffee grounds. Worse yet, all known conventional distribution tools merely rotate the wires about a central axis, just leaving the same circular tracks in the coffee bed. Controlled testing shows these same circular tracks do not improve shot quality or reduce the probability of channeling. Instead, as the pins always follow the same track, more turns only result in more compacted grooves being formed in the coffee bed. Indeed, it is quite easy to cause uneven density throughout the coffee bed if one does Weiss Distribution Technique sloppily or too aggressively. Even with sufficient skill, time, and attention, it is difficult to achieve consistency. Such problems have been a barrier to adoption of the Weiss Distribution Technique for many coffee bars, where speed and consistency are paramount.

Invoking yet more frustration, a user of a conventional distribution tool often spills coffee grounds out of the portafilter during normal manipulation of the tool for its intended purpose. In an effort to defeat this problem, a funnel is often placed above the portafilter to try to prevent spills.

In a nutshell, most known conventional distribution tools do not redistribute the coffee properly; instead they are effectively tampers in contravention to "preparation before tamping." Stated differently, to create a properly homogenized coffee bed within the portafilter using a conventional distribution tool, one needs to have a great deal of skill, patience, focus, and perhaps a bit of luck and sense of humor.

Accordingly, a coffee grounds homogenizer is desired to automate the process of preparation before tamping wherein any user may properly, consistently, cleanly, and quickly homogenize the coffee bed to ensure an evenly extracted coffee.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Figure 2:
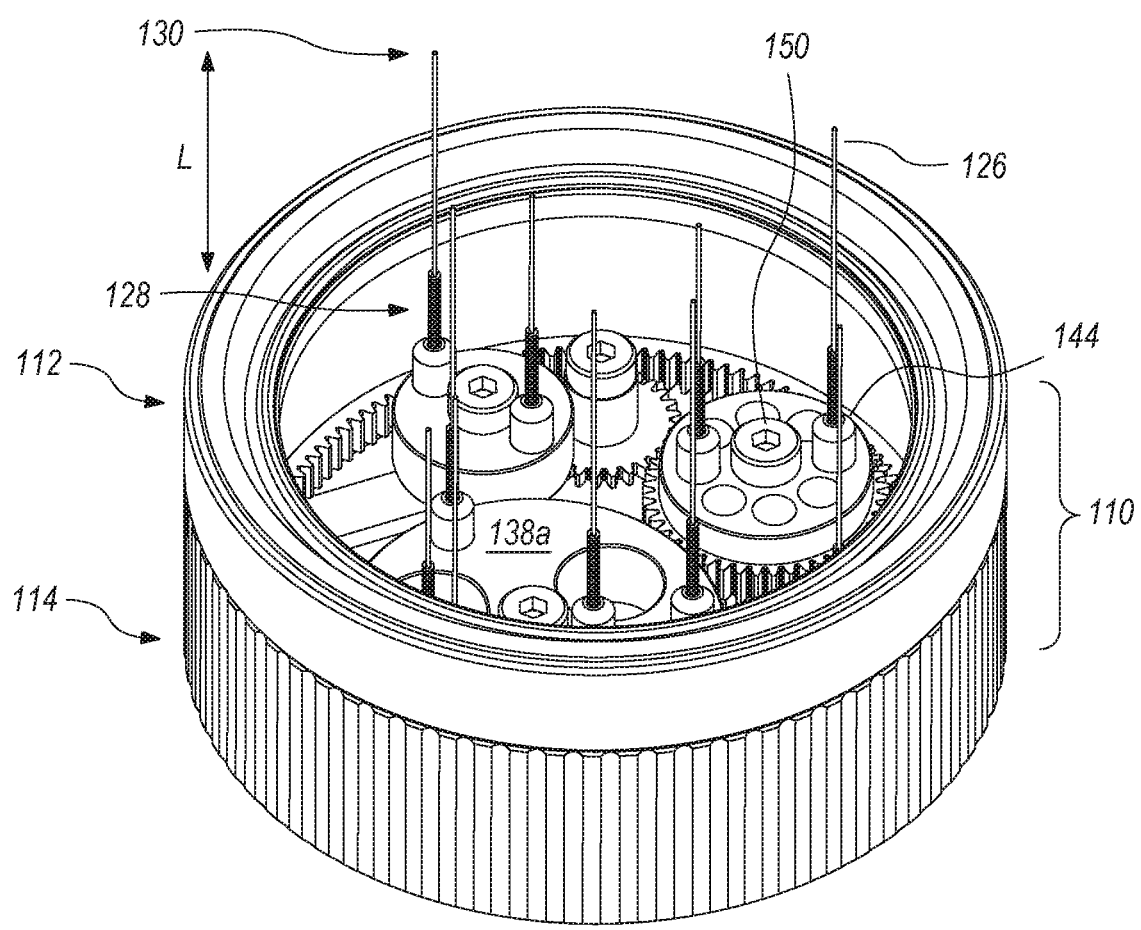
FIG. 2 is bottom perspective view of the automated coffee grounds homogenizer seen in FIG. 1.
Figure 3:
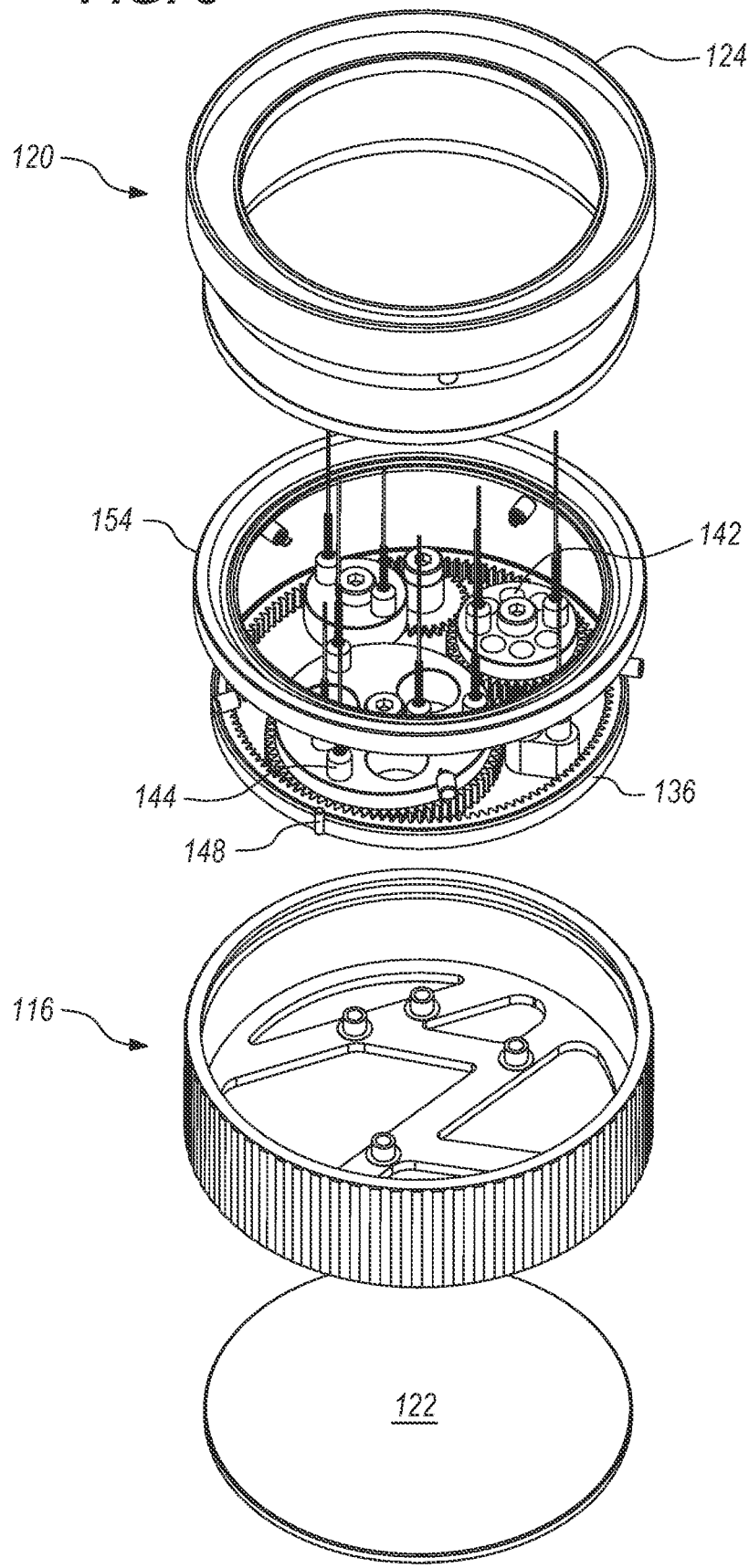
FIG. 3 is an exploded view of the automated coffee grounds homogenizer seen in FIG. 2.
Figure 4:
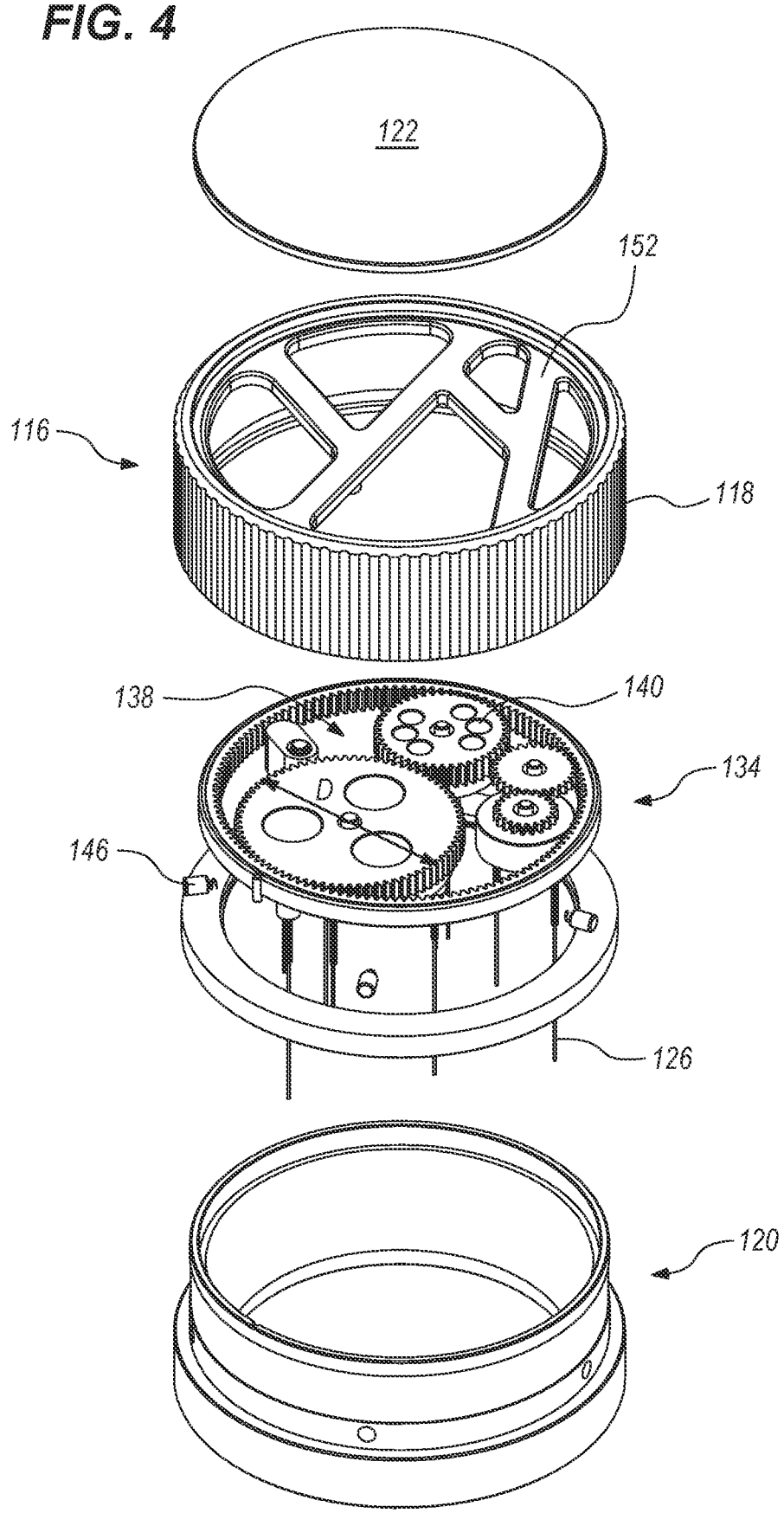
FIG. 4 is a top, exploded perspective view of the automated coffee grounds homogenizer as seen in FIG. 2.

FIGS. 1-4 illustrate an embodiment of the automated coffee grounds tool 100 for properly homogenizing coffee grounds 108 contained within a portafilter 102 having a top 104 and an opposing bottom 106. As seen in these figures, homogenizing tool 100 includes a body 110 having a top 112, an opposing bottom 114, and a central axis A. The body 110 preferably includes a cap 116 rotatably disposed about a base 120. The cap has optional gripping means 118 and attachment means 152. An optional window 122, preferably made of glass or other transparent material, is disposed about the top 112 of the cap 116. An elastomer gasket 124 or the like is disposed about the bottom of the base 120. The elastomer gasket 124 is configured to provide a frictional force, wherein the frictional force is great enough to keep the base 120 seated about the portafilter 102 during rotation of the cap 116 about the base 120. Instead of the elastomer gasket 124, such structure may be replaced by one or two "fingers" (not shown) that rotationally lock against tabs (not shown) on the side of the portafilter 102.

The automated coffee grounds homogenizer 100 also comprises a plurality of stirs 126. Each stir 126 has a top 128 and an opposing bottom 130. The top 128 of each stir 126 is in communication with the body 110, wherein the bottom 130 of each stir 126 extends away from the bottom 114 of the body 110. The top 128 of each stir 126 is in communication with the body 110 by way of a magnetic stir sleeve 144 disposed about the top 128 of each stir 126. Each stir 126 may be as thin as 0.2 mm and as thick as 0.5 mm depending on user preference. Each stir 126 is preferably around 0.3-0.35 mm as such diameter provides the correct amount of mixing without leaving too big of a "track" in the coffee powder 108 when finished. Each stir 126 has a length L. The length L of each stir 126 is preferably one of sufficient length to reach down to the bottom 106 of the portafilter 102 to ensure complete homogenization. Moreover, as not all portafilters 102 have the same depth, the magnetic detachability of each stir 126 allows for ease of user configuration wherein whatever the depth of the particular user's portafilter 102, the correct length L may be employed. Stated differently, the lengths of the stirs 126 may be varying to reach the bottom 106 of the portafilter 102. In a similar manner, different coffee powders 108 may respond differently to different diameters of a stir 126. Thus, a user of tool 100 may desire to switch out stirs 126 having differing diameters depending on whether the user is preparing light roasted coffee versus a darker roasted coffee.

The automated coffee grounds homogenizer 100 further includes a gear means 134 for randomly rotating the plurality of stirs 126 about the central axis A of the body. The gear means 134 includes an outer gear 136 disposed within the body 110 and an inner gear set 138 in communication with the outer gear 136. The outer gear 136 is coupled to a lock ring 154 by way of a plurality of cap lock pins 150. The outer gear 136 is similarly coupled to the inner gear set 138 by way of one or more gear lock pins 148. The inner gear set 138 preferably includes gears 138a each having a different diameter D. The inner gear set 138 is coupled to the attachment means 152 of the cap 116 by way of screws 150. Since screws 150 are employed, the user may also switch out one gear 138a with another 138a by merely unscrewing one gear 138a and replacing it with another. In this manner, the rotation of the path of the stirs 126 about the central axis A of the body 110 may be changed by mere substitution of differing gears 138a.

Each stir 126 is detachable to the inner gear set 138 by magnetic means. In particular, each gear 138a has a plurality of magnet channels 140. Each such channel 140 is configured to receive a magnet 142. Each magnet 142 is attracted to each stir sleeve 144 of each magnetic stir 126 to permit a user to modify the placement of each stir 126 within the body 110. In this manner, a first placement of stirs 126 creates a first path of rotation about the central axis A of the body 110. Detachably coupling one of the plurality of stirs 126 and moving it to a different respective magnet 142 changes the movement to a second path of random rotation, if desired by the user.

In operation, a user of homogenizing tool 100 desires to create the perfect espresso. The user begins by properly grinding coffee beans and placing the ground coffee 108 into a brewing receptacle such as portafilter 102. Next, the user turns to the task of puck preparation before tamping by employing automated tool 100. The user may begin such process by measuring the depth of the portafilter 102 as against the length L of a stir 126. If the particular stir 126 does not have a length sufficient enough to reach near the bottom 106 of the portafilter 102 when the stir 126 is attached to a respective magnet 142, then the user may desire to change out the stir 126 to one having a greater length L. The user may also wish to change out a stir 126 having a certain diameter to one of a different diameter depending on the type of coffee grounds 108 to be homogenized. Once the correct stir 126 has been determined, the user simply attaches one stir 126 to the inner gear set 138 by way of a respective magnet 142. Additional stirs 126 are attached as desired.

Next, the user touches the elastomeric gasket 124 to the lip of the portafilter 102 and simply rotates the cap 116 about the base 110. Doing so initiates movement of the gear means 134 wherein the stirs 126 are caused to rotate about the central axis A of the body and thereby randomly rotate the coffee grounds 108 within portafilter 102. As the friction of the elastomeric gasket 124 is larger than the resistance of the gear means 134 and the plurality of stirs 126 moving through the coffee grounds 108, proper homogenization is effected. Controlled testing shows the disclosed invention 100 continues to randomize/homogenize more and more with increased rotations. Such testing reveals only about five rotations of the cap 116 are needed before the user has a perfectly prepared bed of coffee grounds 108. Should the user desire to switch out gears 138a within the inner gear set 138 to change the random path of rotation of the stirs 126 about the central axis A, the user simply removes one of the screws 150 of one gear 138a, removes another of the screws 150 of another gear 138a, and simply switches the two gears 138a out.

It should now be apparent that even an inexperienced barista may employ the disclosed automated coffee grounds tool to homogenize a coffee bed properly, consistently, cleanly, and quickly to ensure an evenly extracted coffee. While certain embodiments have been described, the embodiments have been presented by way of example only and are not intended to limit the scope of the inventions. Indeed, the novel automated coffee grounds tool described herein may be embodied in a variety of other forms. Furthermore, various omissions, substitutions, and changes in the form of the disclosed elements may be made without departing from the spirit of the inventions. The accompanying claims and their equivalents are intended to cover such forms or modifications as would fall within the scope and spirit of the inventions.

The invention claimed is:

1. An automated coffee grounds homogenizer comprising:
   a body having a top and an opposing bottom and a central axis;
   a plurality of stirs each having a top and an opposing bottom, wherein the top of each stir is in communication with the body, and wherein the bottom of each stir extends away from the bottom of the body; and
   a gear means for rotating the plurality of stirs about the central axis of the body, wherein the gear means comprises an outer gear and an inner gear set, wherein the outer gear is disposed within the body, wherein the inner gear set is in communication with the outer gear, wherein the inner gear set comprises a plurality of gears with each having a different diameter, and wherein the plurality of gears is interchangeable with one another whereby the rotation of the stirs about the central axis of the body may be changed by switching out one of the plurality of gears with another of the plurality of gears.

2. The automated coffee grounds homogenizer of claim 1, wherein the body comprises a base and a cap rotatably disposed about the base, wherein rotation of the cap engages the gear means to rotate the plurality of stirs about the central axis.

3. The automated coffee grounds homogenizer of claim 1, wherein each stir is detachable to the inner gear set.

4. The automated coffee grounds homogenizer of claim 3, wherein each gear within the inner gear set includes a plurality of magnet channels cut therewithin, and further comprising a plurality of magnets, wherein each magnet channel is configured to receive one of the plurality of magnets.

5. The automated coffee grounds homogenizer of claim 4, further comprising a stir sleeve coupled to the top of each stir, wherein each stir sleeve is magnetically detachable to a respective magnet.

6. The automated coffee grounds homogenizer of claim 2, further comprising an elastomer gasket coupled to the base, wherein the elastomer gasket is configured to seat about a portafilter, wherein the elastomer gasket is configured to provide a frictional force between the cap and the base, wherein the frictional force is great enough to keep the base seated about the portafilter during rotation of the plurality of stirs.

7. The automated coffee grounds homogenizer of claim 2, further comprising a window coupled to the cap.

8. An automated tool for homogenizing coffee grounds within a portafilter, the tool comprising:
   a generally cylindrical base having a central axis;
   a cap rotatably disposed about the base;
   an outer gear in communication with the cap;
   a plurality of inner gears in communication with the outer gear, wherein each inner gear has a diameter and each diameter is different; and
   a plurality of stirs each of which is detachably coupled to one of the plurality of inner gears, wherein rotation of the cap about the base causes the plurality of inner gears to rotate about the central axis, whereby coffee grounds contained within the portafilter are homogenized by movement of the plurality of stirs.

9. The automated coffee grounds homogenizer tool of claim 8, further comprising an elastomer gasket coupled to the base, wherein the elastomer gasket is configured to seat about the portafilter, and wherein the elastomer gasket is configured to provide a frictional force between the cap and the base, wherein the frictional force is great enough to keep the base seated about the portafilter during rotation of the plurality of stirs.

10. The automated coffee grounds homogenizer tool of claim 8, wherein each of the plurality of stirs is detachably coupled to one of the plurality of inner gears by a respective magnet disposed about one of the plurality of inner gears.

11. The automated coffee grounds homogenizer tool of claim 8, further comprising a window disposed about the cap.

12. The automated coffee grounds homogenizer tool of claim 8, wherein each stir has a top end and a bottom end defining a length, wherein the portafilter has a top and an opposing bottom, wherein the length of each stir is of a length sufficient to reach near the bottom of the portafilter.

13. The automated coffee grounds homogenizer tool of claim 12, wherein each stir has a diameter between about 0.2 millimeters to 0.5 millimeters.

14. The automated coffee grounds homogenizer tool of claim 8, wherein each stir has a top end and a bottom end defining a length, wherein the portafilter has a top and an opposing bottom, wherein the lengths of the stirs are varying to reach the bottom of the portafilter.

15. The automated coffee grounds homogenizer tool of claim 8, wherein rotation of the stirs about the central axis of the body creates a path, wherein each inner gear is interchangeable with one another, wherein the path may be changed by switching out one of the inner gears with another.

16. The automated coffee grounds homogenizer tool of claim 8, wherein rotation of the stirs about the central axis of the body creates a path, wherein each of the plurality of stirs is detachably coupled to one of the plurality of inner gears by a respective magnet disposed about one of the plurality of inner gears, wherein detachably coupling one of the plurality of stirs and moving the one of the plurality of stirs to a different respective magnet changes the path.

17. An automated coffee grounds homogenizer comprising:
   a body having a top and an opposing bottom and a central axis;
   a plurality of stirs each having a top and an opposing bottom, wherein the top of each stir is in communication with the body, and wherein the bottom of each stir extends away from the bottom of the body; and
   an outer gear and an inner gear set for rotating the plurality of stirs about the central axis of the body, wherein the outer gear is disposed within the body, wherein the inner gear set is in communication with the outer gear, wherein the inner gear set comprises a plurality of gears with each having a different diameter, and wherein each stir is detachable to the inner gear set.

* * * * *